(12) United States Patent
Margabandu et al.

(10) Patent No.: US 9,910,806 B2
(45) Date of Patent: Mar. 6, 2018

(54) UNIVERSAL SERIAL BUS (USB) HUB FOR SWITCHING DOWNSTREAM PORTS BETWEEN HOST MODE AND SLAVE MODE

(71) Applicant: ALLGO EMBEDDED SYSTEMS PRIVATE LIMITED, Bangalore (IN)

(72) Inventors: Magesh Margabandu, Bangalore (IN); Srinivasan Krishnaswamy, Bangalore (ID); Vikas Shukla, Bangalore (IN); Ashutosh Srivastva, Bangalore (IN)

(73) Assignee: ALLGO EMBEDDED SYSTEMS PRIVATE LIMITED, Bangalore (IN)

( * ) Notice: Subject to any disclaimer, the term of this patent is extended or adjusted under 35 U.S.C. 154(b) by 176 days.

(21) Appl. No.: 15/027,337

(22) PCT Filed: Oct. 22, 2014

(86) PCT No.: PCT/IB2014/065544
§ 371 (c)(1),
(2) Date: Apr. 5, 2016

(87) PCT Pub. No.: WO2015/059654
PCT Pub. Date: Apr. 30, 2015

(65) Prior Publication Data
US 2016/0232122 A1    Aug. 11, 2016

(30) Foreign Application Priority Data
Oct. 22, 2013  (IN) ........................... 4563/CHE/2013

(51) Int. Cl.
*G06F 13/00*   (2006.01)
*G06F 13/40*   (2006.01)
(Continued)

(52) U.S. Cl.
CPC .......... *G06F 13/4022* (2013.01); *G06F 13/00* (2013.01); *G06F 13/105* (2013.01); *G06F 13/364* (2013.01); *G06F 13/385* (2013.01)

(58) Field of Classification Search
None
See application file for complete search history.

(56) References Cited

U.S. PATENT DOCUMENTS 8,677,947 B2 * 3/2014 Ookubo ............... F22B 35/008
                                                            122/448.3
2007/0245058 A1  10/2007 Wurzburg et al.
(Continued)

FOREIGN PATENT DOCUMENTS

WO    2006031776    3/2006

OTHER PUBLICATIONS

International Search Report, issued in the corresponding International PCT application No. PCT/IB2014/065544, dated Jan. 12, 2015, 3 pages.

*Primary Examiner* — Henry Tsai
*Assistant Examiner* — Dean Phan
(74) *Attorney, Agent, or Firm* — Hamre, Schumann, Mueller & Larson, P.C.

(57) ABSTRACT

Embodiment of present disclosure relates to a Universal Serial Bus (USB) hub for switching downstream ports between host mode and slave mode comprising upstream port connectable to host port of host, downstream port and switching module. The downstream port is connectable to device port of peripheral device and acts in host mode and said device port acts in slave mode. The switching module comprises master port, switching port and control unit. The master port is connectable to upstream port. The switching port is connectable to other end of downstream port, the switching port acts in host mode. The control unit receives switch command from host to switch downstream port from (Continued)

host mode to slave mode; switches switching port to slave mode and enables downstream port to act in the slave mode when host emulates functionality of slave mode as required by peripheral device using vendor specific USB class.

10 Claims, 6 Drawing Sheets

(51) Int. Cl.
    *G06F 13/10*     (2006.01)
    *G06F 13/364*     (2006.01)
    *G06F 13/38*     (2006.01)

(56) References Cited

U.S. PATENT DOCUMENTS

| | | | |
|---|---|---|---|
| 2011/0013624 A1* | 1/2011 | Lerzer | G06F 13/4022 370/360 |
| 2011/0029703 A1 | 2/2011 | Huo et al. | |
| 2011/0034162 A1* | 2/2011 | Lerzer | H04W 88/06 455/422.1 |

* cited by examiner

UNIVERSAL SERIAL BUS (USB) HUB FOR SWITCHING DOWNSTREAM PORTS BETWEEN HOST MODE AND SLAVE MODE

TECHNICAL FIELD

The present disclosure relates to communication field, and in particular, to a Universal Serial Bus (USB) hub and a method for switching downstream ports of the USB hub between host mode and slave mode.

BACKGROUND

Generally, a Universal Serial Bus (USB) hub is a standard hub for connectivity of host to peripheral devices. The host includes, but is not limited to, Personal Computers (PC), notebook or laptop computers and related devices. The peripherals devices include, but are not limited to, printers, external memory devices, speakers, scanners, cameras, smart phones, music players and the like. The USB hub comprises one or more ports which function as "upstream" and "downstream" ports. The upstream port is connected to a host/controlling device such as the PC which acts as the master device. The downstream ports are used to connect to peripheral devices such as mobile phones and USB drives which act as slave devices. The downstream ports act in a host mode for the peripheral devices and in turn, the ports of the peripheral devices act in a slave mode.

Usually, the exchange of data between the host and the peripheral devices is achieved using the host. For example, the host is used to transfer the data or files into a peripheral device for example a mobile phone. Also, the host is used to transfer the data or files from the peripheral device into the host. That is, the host masters exchange of data with the one or more peripheral devices. Thus, there is no aspect of using the one or more peripheral devices as a master device//host for carrying out the exchange of data. That is, in the existing USB hubs, there is no provision of enabling the peripheral devices to act as host or master devices.

Further, conventionally, USB hubs do not have ability to switch the ports of the USB hub between host mode and slave mode. Existing USB hubs comprise ports which remain in their conventional modes and do not have ability to switch from host mode to slave mode and vice versa. Additionally, the existing USB hubs do not have a mechanism o support both the USB hosts and USB devices based class configurations over a single port.

Thus, there is a need to provide a USB hub that performs dynamic switching of one or more ports between host mode and slave mode, thus enabling the peripheral devices to switch between slave mode and host mode.

SUMMARY

An objective of the present disclosure is to switch downstream ports of a Universal Serial Bus (USB) hub between host mode and slave mode by using a switching module of the USB hub. Another objective of the present disclosure is to enable a device port of a peripheral device connected to a downstream port to act in a host mode upon enabling the corresponding downstream port to act in a slave mode.

A Universal Serial Bus (USB) hub for switching downstream ports between host mode and slave mode is disclosed in the present disclosure. Usually, the USB hub connects a controlling device or host or master device to one or more peripheral devices. The USB hub comprises various ports connectable to one or more ports of the controlling device/ master device/host and ports of the peripheral devices. Typically, the host/controlling device/master device controls functioning or operations of the connected peripheral devices. Therefore, when one or more ports of a device enables the respective device to act as a master device or host, then the one or more ports of such a device are considered to be in a mode called host mode. In an embodiment of the present disclosure, the USB hub comprises an upstream port, a downstream port and a switching module. The upstream port with one end is connectable to a host port of a corresponding host. The switching module comprises a master port, a switching port and a control unit. The downstream port with one end is connectable to a device port of a peripheral device and other end of the downstream port linked to the switching port of the switching module. The downstream port acts in host mode and said device port acts in slave mode. In an embodiment, the switching port acts in host mode. The master port is connectable to other end of the upstream port. The control unit is configured to receive a switch command from the host to switch the downstream port from the host mode to a slave mode to enable the corresponding device port of the peripheral device to act in a host mode. The control unit is configured to switch the switching port from host mode to slave mode. The control unit is configured to enable the downstream port to act in the slave mode when the host emulates functionality of slave mode as required by the peripheral device connected to the downstream port using a vendor specific USB class. The device port of the peripheral device acts in the host mode upon enabling the at least one port of the at least one downstream port to act in the slave mode.

A Universal Serial Bus (USB) hub for switching downstream ports between host mode and slave mode is disclosed in the present disclosure. The USB hub comprises an upstream port, at least one downstream port, an internal hub and a switching module. The upstream port with one end is connectable to a host port of a corresponding host. The at least one downstream port with one end is connectable to a device port of a peripheral device. The at least one downstream port acts in a host mode and said device port acts in a slave mode. The internal hub comprises an internal upstream port and one or more internal downstream ports. The internal upstream port is connectable to other end of the upstream port. One or more ports of the one or more internal downstream ports are linked to other end of the corresponding at least one downstream port. The switching module comprises a master port, a switching port which acts in host mode and a control unit. The master port is connectable to an internal downstream port of the one or more internal downstream ports. The control unit is configured to receive a switch command from the host to switch at least one port of the at least one downstream port from the host mode to a slave mode to enable the corresponding device port of the peripheral device to act in a host mode. The control unit is configured to disconnect the link between the one or more ports of the one or more internal downstream ports and the corresponding at least one port of the at least one downstream port. The control unit is configured to connect the at least one port of the at least one downstream port to the switching port. The control unit is configured to switch the switching port from host mode to slave mode. The control unit is configured to enable the at least one port of the at least one downstream port to act in the slave mode when the host emulates functionality of slave mode as required by the peripheral device connected to the at least one port of the at least one downstream port using a vendor specific USB class. The device port of the peripheral device acts in the host mode upon enabling the at least one port of the at least one downstream port to act in the slave mode.

The present disclosure is related to a method for switching downstream port of a Universal Serial Bus (USB) between host mode and slave mode. The method comprises one or more steps performed by a control unit of a switching module of the USB hub. First step of the method comprises receiving a switch command from a host to switch a downstream port of the USB hub from the host mode to a slave mode to enable a corresponding device port of a peripheral device connectable with the downstream port to act in a host mode. The USB hub comprises an upstream port, the downstream port and a switching module. The upstream port with one end is connectable to a host port of the corresponding host and other end is connectable to a master port of the switching module. The downstream port with one end is connectable to the device port of the peripheral device and other end is connectable to a switching port of the switching module. In an embodiment, each of downstream port and the switching port acts in a host mode and said device port acts in a slave mode. Second step of the method comprises switching the switching port from host mode to slave mode. Third step of the method comprises enabling the downstream port to act in the slave mode when the host emulates functionality of slave mode as required by the peripheral device connected to the downstream port using a vendor specific USB class. The device port of the peripheral device acts in the host mode upon enabling the downstream port to act in the slave mode.

The present disclosure is related to a method for switching downstream ports of a Universal Serial Bus (USB) between host mode and slave mode. The method comprises one or more steps performed by a control unit of a switching module of the USB hub. First step of the method comprises receiving a switch command from a host to switch at least one port of at least one downstream port of the USB hub from the host mode to a slave mode to enable a corresponding device port of a peripheral device connectable with the at least one port of the at least one downstream port to act in a host mode. The USB hub comprises an upstream port, at least one downstream port, an internal hub and the switching module. The upstream port with one end is connectable to a host port of the corresponding host. The at least one downstream port with one end is connectable to the device port of the peripheral device. The at least one downstream port acts in a host mode and said device port acts in a slave mode. The internal hub comprises an internal upstream port one or more internal downstream ports. The internal upstream port is connectable to other end of the upstream port. One or more ports of the one or more internal downstream ports are linked to other end of the corresponding at least one downstream port. One internal downstream port is linked to a master port of the switching module. Second step of the method comprises disconnecting the link between the one or more ports of the one or more internal downstream ports and the corresponding at least one port of the at least one downstream port. Third step of the method comprises connecting the at least one port of the at least one downstream port to a switching port of the switching module. In an embodiment, the switching port acts in host mode. Fourth step of the method comprises switching the switching port from host mode to slave mode. Fifth step of the method comprises enabling the at least one port of the at least one downstream port to act in the slave mode when the host emulates functionality of slave mode as required by the peripheral device connected to the at least one port of the at least one downstream port using a vendor specific USB class. The device port of the peripheral device acts in the host mode upon enabling the at least one port of the at least one downstream port to act in the slave mode.

The present disclosure is related to a non-transitory computer readable medium. The non-transitory computer readable medium includes operations stored thereon that when processed by at least one control unit cause a switching module of a Universal Serial Bus (USB) hub to perform one or more actions by performing the acts of receiving a switch command from a host to switch a downstream port of the USB hub from the host mode to a slave mode to enable a corresponding device port of a peripheral device connectable with the downstream port to act in a host mode, said USB hub comprises an upstream port with one end connectable to a host port of the corresponding host and other end connectable to a master port of the switching module, the downstream port with one end connectable to the device port of the peripheral device and other end connectable to a switching port of the switching module, wherein each of the downstream port and the switching port acts in a host mode and said device port acts in a slave mode; switching the switching port from host mode to slave mode; and enabling the downstream port to act in the slave mode when the host emulates functionality of slave mode as required by the peripheral device connected to the downstream port using a vendor specific USB class, wherein the device port of the peripheral device acts in the host mode upon enabling the downstream port to act in the slave mode.

The present disclosure is related to a non-transitory computer readable medium. The non-transitory computer readable medium includes operations stored thereon that when processed by at least one control unit cause a switching module of a Universal Serial Bus (USB) hub to perform one or more actions by performing the acts of receiving a switch command from a host to switch at least one port of at least one downstream port of the USB hub from the host mode to a slave mode to enable a corresponding device port of a peripheral device connectable with the at least one port of the at least one downstream port to act in a host mode, said USB hub comprises an upstream port with one end connectable to a host port of the corresponding host, the at least one downstream port with one end connectable to the device port of the peripheral device, wherein the at least one downstream port acts in a host mode and said device port acts in a slave mode, and an internal hub comprising an internal upstream port connectable to other end of the upstream port and one or more internal downstream ports, wherein one or more ports of the one or more internal downstream ports are linked to other end of the corresponding at least one downstream port and one internal downstream port is linked to a master port of the switching module; disconnecting the link between the one or more ports of the one or more internal downstream ports and the corresponding at least one port of the at least one downstream port; connecting the at least one port of the at least one downstream port to a switching port of the switching module, wherein the switching port acts in host mode; switching, by the control unit, the switching port from host mode to slave mode; and enabling, by the control unit, the at least one port of the at least one downstream port to act in the slave mode when the host emulates functionality of slave mode as required by the peripheral device connected to the at least one port of the at least one downstream port using a vendor specific USB class, wherein the device port of the peripheral device acts in the host mode upon enabling the at least one port of the at least one downstream port to act in the slave mode.

The foregoing summary is illustrative only and is not intended to be in any way limiting. In addition to the illustrative aspects and features described above, further aspects, and features will become apparent by reference to the drawings and the following detailed description.

BRIEF DESCRIPTION OF THE DRAWINGS

The novel features and characteristic of the present disclosure are set forth in the appended claims. The embodiments of the present disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

The figures depict embodiments of the present disclosure for purposes of illustration only. One skilled in the art will readily recognize from the following description that alternative embodiments of the structures and methods illustrated herein may be employed without departing from the principles of the present disclosure described herein.

DETAILED DESCRIPTION

The foregoing has broadly outlined the features and technical advantages of the present disclosure in order that the detailed description of the present disclosure that follows may be better understood. Additional features and advantages of the present disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Embodiments of the present disclosure relates to a Universal Serial Bus (USB) hub for switching downstream ports of the USB hub between host mode and slave mode. Usually, the USB hub comprises an upstream port, a downstream port and a switching module comprising a master port, a switching port and a control unit. One end of the upstream port is connectable with a host port of a host and other end of the upstream port is connectable to the master port. One end of the downstream port is connectable to a device port of a peripheral device. The other end of the downstream port is linked to the switching port. Typically, each of the downstream port and the switching port acts in a host mode and the device port of the peripheral device acts in a slave mode. Therefore, the present disclosure performs a switching operation in order to enable the device port of the peripheral device to act in a host mode while enabling the corresponding downstream port to act in a slave mode by using the switching module. The switch operation is performed upon receiving a switch command from the host by the control unit. Upon receiving the switch command, the switching port switches from host mode to slave mode. Thus the downstream port is enabled to act in the slave mode when the host emulates functionality of slave mode as required by the peripheral device connected to the downstream port using a vendor specific USB class.

Further, the embodiments of the present disclosure use an internal hub to connect multiple downstream ports. Thus, the switch operation is performed on at least one of the multiple downstream ports of the USB hub to switch between the host mode and the slave mode.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

Figure 1A:
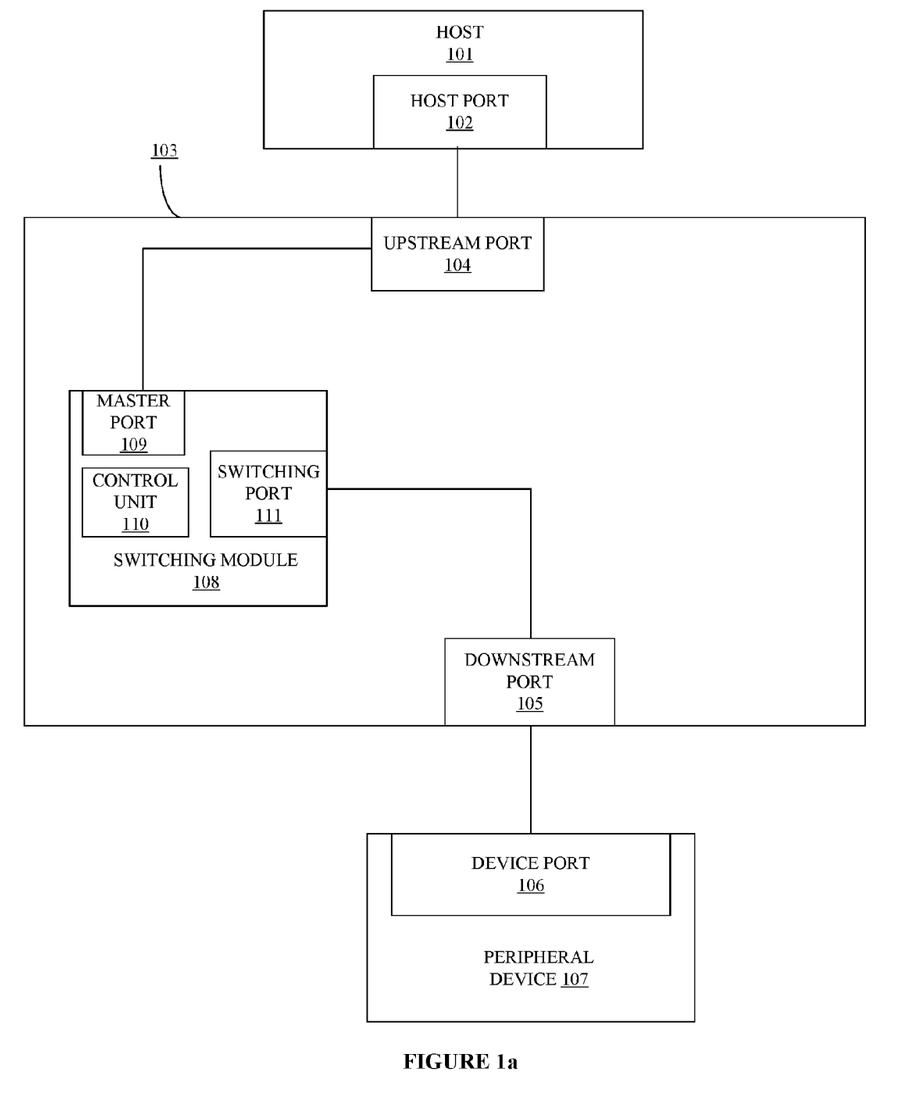
FIG. 1a shows exemplary block diagram of a Universal Serial Bus (USB) hub comprising an upstream port and a downstream port illustrating switching of the downstream port between host mode and slave mode in accordance with some embodiments of the present disclosure.

FIG. 1a shows exemplary block diagram of a Universal Serial Bus (USB) hub 103 comprising an upstream port 104 and a downstream port 105 illustrating switching of the downstream port 105 between host mode and slave mode in accordance with some embodiments of the present disclosure.

The USB hub 103 is a standard of connectivity of a host 101 to a peripheral device 107 for exchange of data. In an embodiment, the host 101 includes, but is not limited to, a laptop computer, a desktop computer personal computer, an automotive infotainment radio system and the like. In one implementation, each of the host 101 must comprise an operating system capable of emulating USB based class device functionality which includes, but is not limited to, Mass storage Class Device (MCD) and Communication Device Class (CDC) Network Control Model (NCM) class devices.

The peripheral device 107 include, but are not limited to, USB printers, scanners, digital cameras, digital camera docks, storage devices, card readers, external memory devices, speakers, smartphones, mobile phones, music players, keyboards, mouse, other USB centered hubs and the like.

Usually, the host 101 acts a master device for the peripheral device 107, which in turn acts as slave device. Particularly, the exchange of data between the host 101 and the peripheral device 107 is achieved through the host 101. For example, the host 101 is used for providing instructions or commands to transfer the data or files into the peripheral device 107, for example a mobile phone. Also, the host 101 is only used for providing instructions or commands to transfer the data or files from the peripheral device 107 into the host 101 or from the host 101 into the peripheral device 107. In an embodiment of the present disclosure, the USB hub 103 enables the peripheral device 107 to act as a master device by switching a corresponding downstream port 105 of the USB hub 103 from the host mode to the slave mode. In such case, the peripheral device 107 may be a dual mode device such that the peripheral device 107 is capable of switching between slave mode and the master mode.

In an embodiment, one or more components and connection of the one or more components of the USB hub 103 with the host 101 and the peripheral device 107 is illustrated herein.

In one implementation, the USB hub 103 comprises an upstream port 104, a downstream port 105 and a switching module 108 comprising a master port 109, a control unit 110 and a switching port 111. The upstream port 104 has one end connectable to a host port 102 of the corresponding host 101. A person skilled in the art should understand that the host 101 may comprise one or more host ports. In an embodiment, the one end of the upstream port 104 is connectable to the host port 102 of the corresponding host 101 by using connecting interface for example USB cables and the like. The downstream port 105 has one end connectable to a device port 106 of the corresponding peripheral device 107. The other end of the downstream port 107 is connected to the switching port 111 of the switching module 108.

In one implementation, the switching module 108 is used for switching the downstream port 105 from the host mode to the slave mode to enable the corresponding connected device port 106 of the peripheral device 107 to act in the host mode. The master port is connectable to other end of the upstream port 104. The switching port 111 connected to the downstream port 105 enables the downstream port 105 to act in the host mode. In one implementation, the switching port 111 may be an On-The-Go (OTG) port capable switching the downstream port 105 between the host mode and the slave mode based on instructions or commands chosen to perform on the downstream port 105.

The control unit 110 is at least one of a processor, controller, microcontroller or state machine and a processor capable of processing and executing the functions of USB related processes. The control unit 110 may also be implemented as a combination of computing devices, e.g., a combination of a DSP and a microprocessor, a microprocessor, a plurality of microprocessors, one or more microprocessors in conjunction with a Digital Signal Processor (DSP) core, or any other such configuration. The control unit 110 performs one or more functions for switching the downstream port 105 between the host mode and the slave mode. The one or more functions are stored in a memory (not shown in FIG. 1a) of the USB hub 103. The memory includes, but is not limited to, Electronically Erasable Programmable Read-Only Memory (EEPROM), Programmable Read-Only Memory (PROM), firmware, programmable logic memory, Random Access Memory (RAM), Read Only Memory (ROM), Compact Disc read Only Memory (CD-ROM) or other optical disk storage, magnetic disk storage or other magnetic storage devices, or any other medium which can be used to store information related to USB based functions. In an embodiment, the control unit 110 can be configured in the USB hub 103 outside the switching module 108.

In an embodiment, the peripheral device 107 is selected using the host 101 to configure the peripheral device 107 to act as master device i.e. host. For example, considering the user wants to configure the peripheral device 107 as a master device. The device port 106 of the peripheral device 107 is connected to the downstream port 105 which acts in the host mode prior to switching. Therefore, the user selects the peripheral device 107 in the host 101 and initiates a switch command to configure the corresponding downstream port 105 to switch from the host mode to slave mode.

Figure 1B:
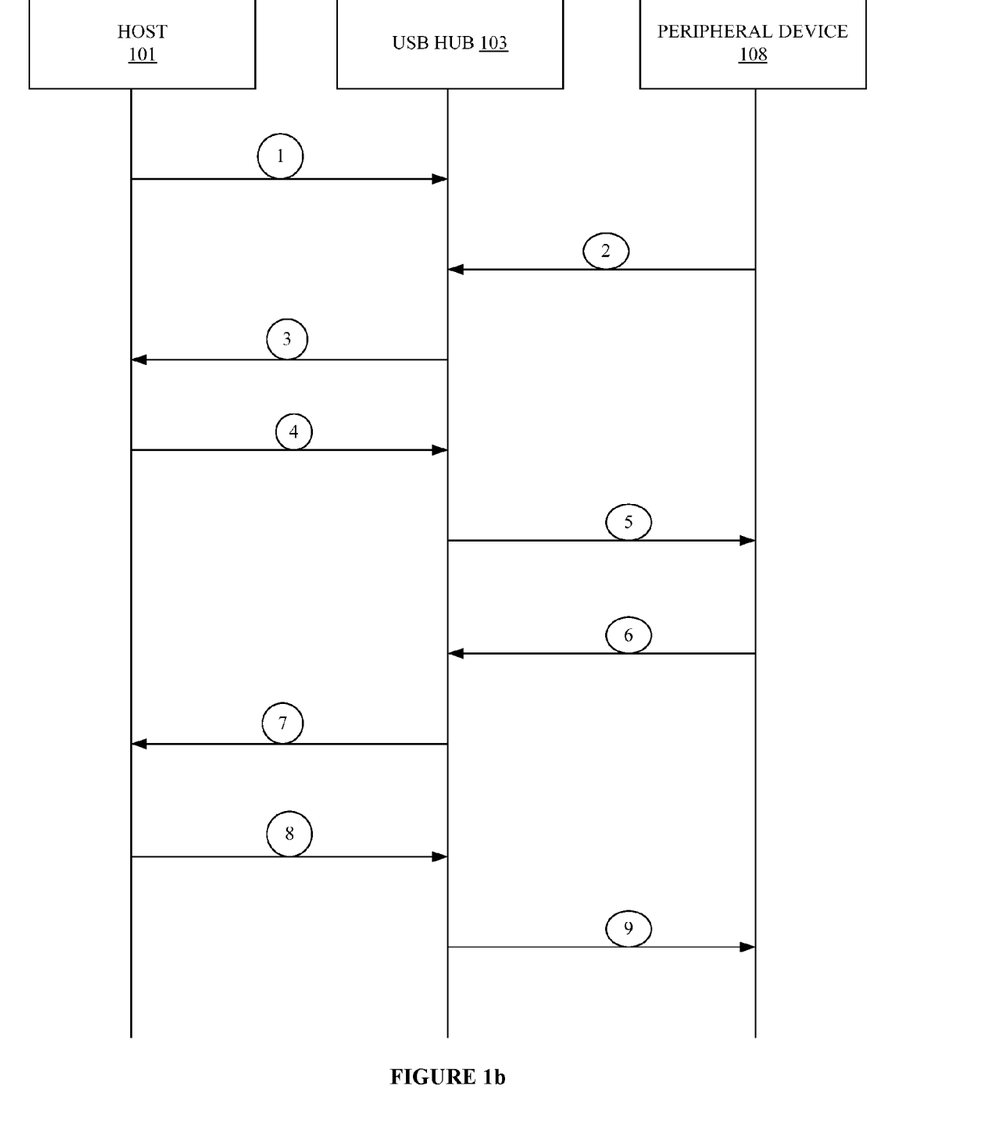
FIG. 1b shows a sequence diagram illustrating switching of downstream port between host mode and slave mode in accordance with some embodiments of the present disclosure.

The switching operation is illustrated in FIG. 1b which shows a sequence diagram illustrating switching of the downstream port 105 between host mode and slave mode. The control unit 110 receives the switch command from the host 101 to switch the downstream port 105 from the host mode to the slave mode to enable the corresponding device port 106 of the peripheral device 107 to act in a host mode. The receiving of the switch command is illustrated by flow "1". Upon receiving the switch command, the control unit 110 switches the switching port 111 from host mode to slave mode thereby enabling the corresponding peripheral device 107 to act in the host mode. In an embodiment, upon switching, the host mode status of the corresponding device port 106 of the peripheral device 107 is reported to the switching module 108 as illustrated by flow "2". That is the device port 106 of the peripheral device 107 acts in the host mode. The control unit 110 provides to the host 101 a vendor specific USB class as required by the peripheral device 107 as illustrated by flow "3".

The vendor specific USB class comprises of a class called Device Emulation Class (DEC) of the peripheral device 107. In the flow "3", the DEC is mentioned to the host 101. In an embodiment, the DEC is a proprietary class which enables the host 101 to emulate standard device class. The DEC comprises multiple configurations which provide interfaces with which the host 101 emulates USB class device functionality of slave mode which includes Mass storage Class Device (MCD), the Communication Device Class (CDC) Network Control Model (NCM) class device and the other such class devices. The host 101 chooses a configuration depending on the device class functionality being chosen for emulation of the functionality of the slave as required by the peripheral device 107. The choosing of an appropriate class configuration is illustrated by flow "4". In an embodiment, the control unit 110 initiates the switching by performing one or more processes which include, but are not limited to, Host Negotiation Protocol (HNP) and Session Negotiation Protocol (SNP). Thus, upon switching, the downstream port 105 is enabled to act in the slave mode.

In an embodiment, upon switching the downstream port 105 to the slave mode, the switching module 108 mentions chosen device class configuration to the peripheral device 107 as illustrated by the flow "5". For example, assuming the host 101 chooses the CDC NCM class configuration for the peripheral device 107. Thus, the switching module 108 mentions the chosen CDC NCM class configuration to the peripheral device 107. The switching module 108 communicates the commands/instructions to and from the peripheral devices 107 through an emulation interface pertaining to the emulation function being chosen. That is, the commands/instructions from the peripheral device 107 is received by the switching module 108 as illustrated by flow "6" where the commands are converted into DEC commands. Then, the switching module 108 sends the DEC command to the host 101 as illustrated by flow "7". In an embodiment, the switching module 108 communicates the commands/instructions through the emulation interface to and from the host 101. That is, the response sent by the host 101 is received by the switching module 108 as illustrated by flow "8". Then, the received response is provided to the peripheral device 107 by the switching module 108 as illustrated by flow "9".

In an embodiment, the control unit 110 performs switching of the downstream port 105 from the slave mode to the host mode so as to enable the peripheral device 107 to switch back from the host mode to the slave mode. For example, the host 101 selects the peripheral device 107 to switch back to the slave mode. Therefore, the host 101 provides a switch command to the control unit 110. The control unit 110 switches the switching port 111 to the host mode thereby enabling the peripheral device 107 to switch back to the slave mode.

Figure 1C:
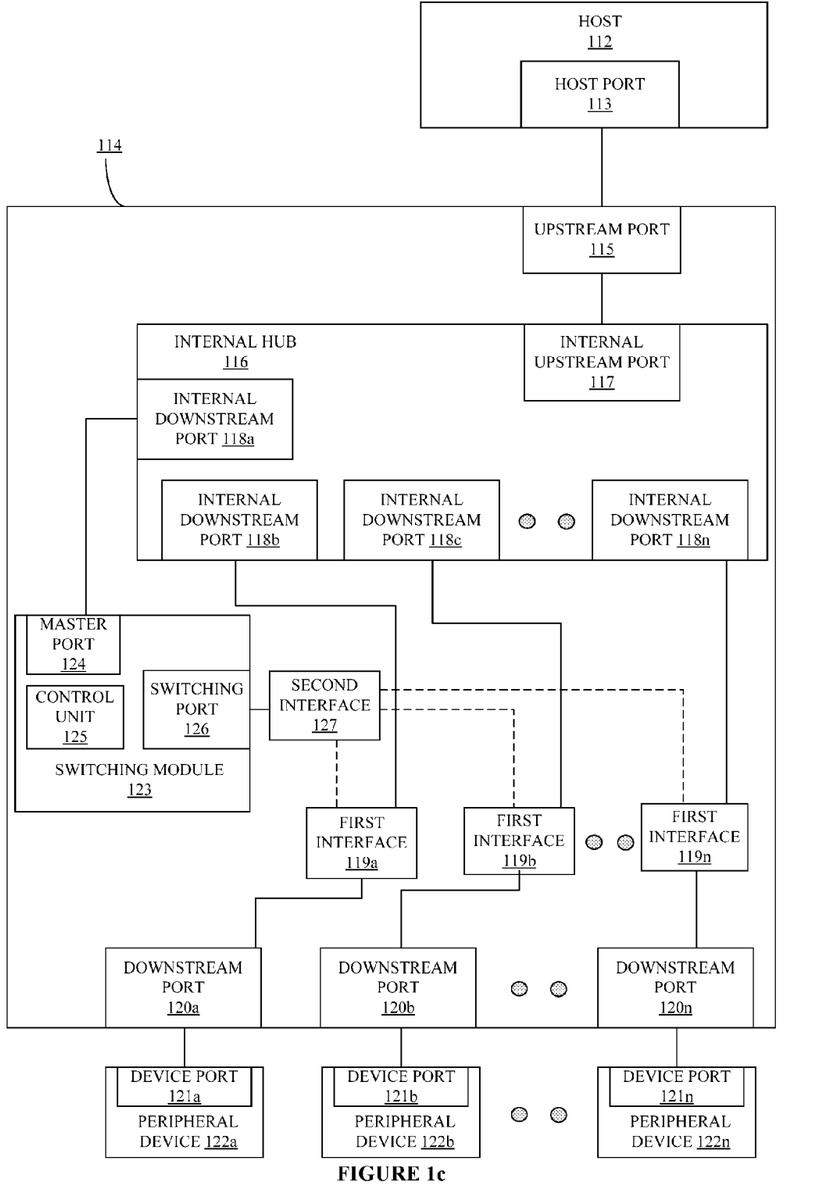
FIG. 1c shows exemplary block diagram of a Universal Serial Bus (USB) hub comprising an upstream port and multiple downstream ports connected to an internal hub illustrating switching of downstream ports between host mode and slave mode in accordance with some embodiments of the present disclosure.

FIG. 1c shows exemplary block diagram of a Universal Serial Bus (USB) hub 114 comprising an upstream port 115 and multiple downstream ports 120a, 120b, . . . , 120n (collectively referred to 120) connected to an internal hub 116 illustrating switching of downstream ports 120 between host mode and slave mode in accordance with some embodiments of the present disclosure.

In an embodiment of the present disclosure, the USB hub 114 enables the one or more peripheral devices 122a, 122b, . . . , 122n (collectively referred to 122) to act as a host. This is done by switching a corresponding downstream port 120 of the USB hub 114 from the host mode to the slave mode. In such case, each of the one or more peripheral devices 122 may be a dual mode device such that the one or more peripheral devices 122 are capable of switching between slave mode and the master mode.

In an embodiment, one or more components and connection of the one or more components of the USB hub 114 with the host 112 and the one or more peripheral devices 122 is illustrated herein.

In one implementation, the USB hub 114 comprises the upstream port 115, at least one downstream port 120, the internal hub 116 and a switching module 123. The upstream port 115 has one end connectable to a host port 113 of the corresponding host 112. The at least one downstream port 120 has one end connectable to a device port 121a, 121b, . . . , 121n (collectively referred to 121) of a corresponding peripheral device 122. The USB hub 114 comprises 'n' number of downstream ports 120 to connect to corresponding 'n' number of peripheral devices 122. For example, the downstream port 120a is connected to a device port 121a of the peripheral device 122a. The downstream port 120b is connected to a device port 121b of the peripheral device 122n and so on. In an embodiment, prior to switching, each of the at least one downstream port 120 acts in a host mode and the device port 121 acts in a slave mode.

The internal hub 116 comprises an internal upstream port 117 and one or more internal downstream ports 118a, 118b, 118c, . . . , 118n (collectively referred to 118). The internal upstream port 117 is connectable to other end of the upstream port 115. In an embodiment, one or more ports of the one or more internal downstream ports are linked to other end of the corresponding at least one downstream port 120. For example, the internal downstream port 118b is linked to the downstream port 120a and the internal downstream port 118c is linked to the downstream port 120b and so on. In an embodiment, each of the one or more internal downstream port 118 is linked to each of the at least one downstream port 120 through corresponding one or more first interfaces 119a, 119b . . . , 119n (collectively referred to 119). For example, the internal downstream port 118b is linked to the downstream port 120a through the first interface 119a and the internal downstream port 118c is linked to the downstream port 120b through the first interface 119b and so on. In one implementation, each of the first interface 119 includes, but is not limited to, switch, multiplexor, Physical Layer (PHY) interface, USB Transceiver Macrocell Interface (UTMI) and UTMI Plus Low Pin Interface (ULPI). For example, the first interface 119 is a 2:1 switch.

In one implementation, the switching module 123 is used for switching the at least one downstream port 120 from the host mode to the slave mode to enable the corresponding connected device port 121 of the peripheral device 122 to act in the host mode. The switching module 123 comprises a master port 124, a switching port 126 and a control unit 125. The master port 124 is connectable to an internal downstream port of the one or more internal downstream ports 118. For example, the master port 124 is connected to the internal downstream port 118a. The switching port 126 is used to connect to at least one port of the at least one downstream port 120 for achieving the switching of the at least one port of the at least one downstream port 120 from the host mode to slave mode. In an embodiment, the switching port 126 acts in host mode. In one implementation, the switching port 126 may be an On-The-Go (OTG) port capable switching the at least one downstream port 120 between the host mode and the slave mode based on instructions or commands chosen to perform on the at least one downstream port 120. In an embodiment, the switching port 126 is connected to the at least one port of the at least one downstream port 120 through a second interface 127. Particularly, the second interface 127 is connected to the corresponding one or more first interfaces 119 for connecting to the at least one port of the at least one downstream port 120. In one implementation, the second interface 127 includes, but is not limited to, switch, multiplexor, Physical Layer (PHY) interface, USB Transceiver Macrocell Interface (UTMI) and UTMI Plus Low Pin Interface (ULPI). For example, the second interface 127 is a n:1 switch.

In an embodiment, one or more devices among the one or more peripheral devices 122 are enabled using the host 112 to operate in host mode. For example, considering the user wants to enable the peripheral device 122a as a host. The device port 121a of the peripheral device 122a is connected to the at least one downstream port 120a which acts in the host mode for the device port 121a prior to switch. Therefore, the user in the host 112 initiates a switch command to enable the corresponding downstream port 120a to switch from the host mode to slave mode so as to enable the peripheral device 122a to operate in the host mode.

The control unit 125 receives the switch command from the host 112 to switch at least one port of the at least one downstream port 120 from the host mode to the slave mode to enable the corresponding device port 121 of the peripheral device 122 to act in a host mode. Upon receiving the switch command, the control unit 125 disconnects the link between the one or more ports of the one or more internal downstream ports 118 and the corresponding at least one port of the at least one downstream port 120 through the first interface. In an embodiment, the control unit 125 programs the corresponding first interface 119 for disconnecting the link between the one or more ports of the one or more internal downstream ports 118 and the corresponding at least one port of the at least one downstream port 120. For example, the link between the internal downstream port 118*b* and the downstream port 120*a* is disconnected by programming the first interface 119*a*.

Upon disconnecting the link, the control unit 125 connects the at least one port of the at least one downstream port 120 to one end of the switching port 126 through the second interface 127. In an embodiment, the at least one port of the at least one downstream port 120 is linked to the switching port 126 through the corresponding first interface 119 and the second interface 127. In an embodiment, upon linking to the switching port 126, the switching port 126 switches from the host mode to the slave and thus the device port 121 of the peripheral device 122 acts in the host mode. Next, the control unit 125 provides a vendor specific class to the host 112.

The vendor specific class comprises of a proprietary USB class called Device Emulation Class (DEC) of the selected peripheral device 122. In an embodiment, the DEC is a proprietary class which enables the host 112 to emulate a standard device class. The DEC comprises multiple configurations which provide interfaces with which the host 112 emulates USB class device functionality which includes MSD, the CDC NCM class device and the other class device. The host 112 chooses a device class configuration depending on the device class functionality being selected for emulation of the functionality of slave as required by the peripheral device 122. The control unit 125 initiates switching of the switching port 126 from the host mode to the slave mode. In an embodiment, the control unit 125 initiates the switching by performing one or more processes which include, but are not limited to, Host Negotiation Protocol (HNP) and Session Negotiation Protocol (SNP). Thus, upon performing the switching operation, the at least one port of the at least one downstream port 120 is enabled to act in the slave mode. For example, the downstream port 120*a* acts in the slave mode. Thus, the device port 121 of the peripheral device 122 is enabled to act in the host mode upon enabling the at least one port of the at least one downstream port 120 to act in the slave mode. For example, the device port 121*a* of the peripheral device 122*a* being selected acts in the host mode i.e. becomes host or master device. In an embodiment, the host 112 remains the host and is not overridden by the new peripheral device being the host. Additionally, the other downstream ports 120*b*, . . . , 120*n* continue to operate in the host mode and the corresponding other peripheral devices for example 122*b*, . . . , 122*n* continue to function in the slave mode. A person skilled in the art should also understand that more than one port of the downstream ports 120 may be switched to slave mode, thus enabling the multiple peripheral devices 122 being switched to host mode.

In an embodiment, the enumeration or mentioning of device class configuration to the peripheral device 122 by the switching module 123 is same as explained in figures 1a and 1b. Further, the process of performing transmission and receiving of commands and response to and from the peripheral device 122 and the host 112 respectively is same as explained in FIG. 1*a* and FIG. 1*b*. Additionally, the process of switching the at least one downstream ports back to host mode form the slave mode is same as explained in FIG. 1*a*.

Figure 2:
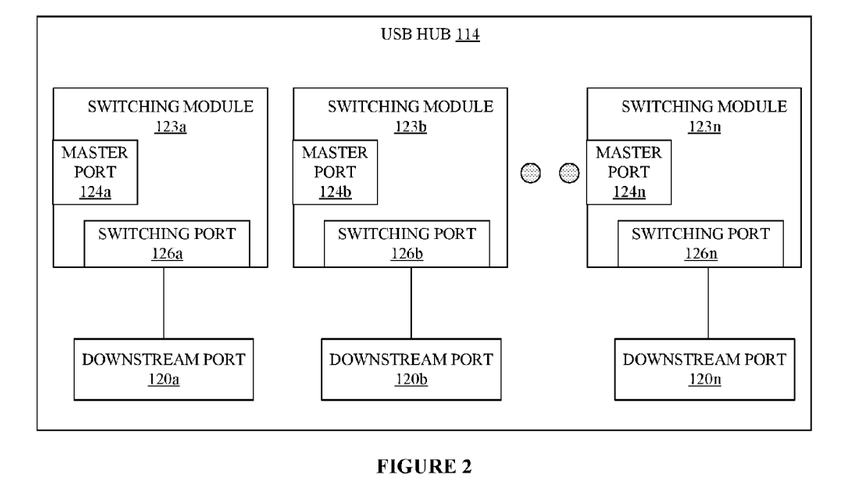
FIG. 2 illustrates configuration of a plurality of switching modules in a USB hub for switching downstream ports between host mode and slave mode in accordance with some embodiments of the present disclosure.

FIG. 2 illustrates configuration of a plurality of switching modules in the USB hub 114 for switching the downstream ports 120 between the host mode and the slave mode. The USB hub 114 may comprise a plurality of switching modules i.e. up to 'n' number of switching modules 123*a*, 123*b*, . . . , 123*n* (collectively referred to 123). Each of the switching modules 123 comprises a master port 124*a*, 124*b*, . . . , 124*n* (collectively referred to 124) respectively and a switching port 126*a*, 126*b*, . . . , 126*n* (collectively referred to 126) respectively. For example, the switching module 123*a* comprises a master port 124*a* and a switching port 126*a* and switching module 123*b* comprises a master port 124*b* and a switching port 126*b* and so on. Each of the switching port 126 is connectable to corresponding downstream port 120 respectively. In an embodiment, each of the switching modules 123 may be controlled by a common control unit (not shown) configured in the USB hub 114.

Figure 3:
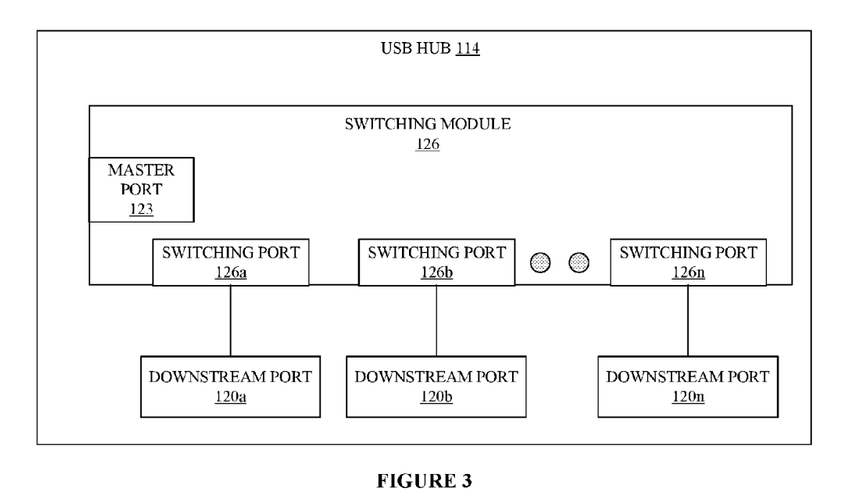
FIG. 3 illustrates configuration of a plurality of switching ports in a switching module of a USB hub for switching downstream ports between host mode and slave mode in accordance with some embodiments of the present disclosure.

FIG. 3 illustrates configuration of a plurality of switching port 126*a*, 126*b*, . . . , 126*n* in the switching module 123 of the USB hub 114 for switching the corresponding at least one downstream ports 120 between host mode and slave mode in accordance with some embodiments of the present disclosure. The USB hub 114 can comprise the switching module 123 comprising the master port 124 and up to 'n' number of switching ports 126. Each of the switching port 126 is connectable to corresponding downstream port 120 respectively.

Figure 4:
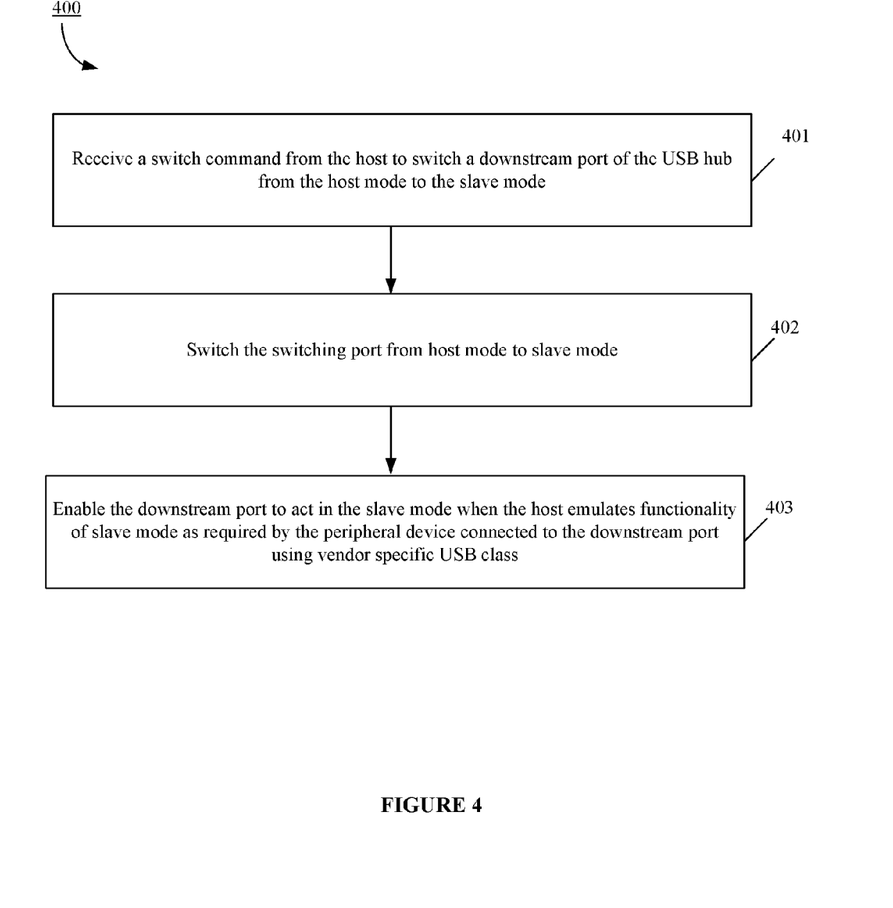
FIG. 4 illustrates a flowchart of method for switching a downstream port between the host mode and the slave mode in accordance with some embodiments of the present disclosure.
Figure 5:
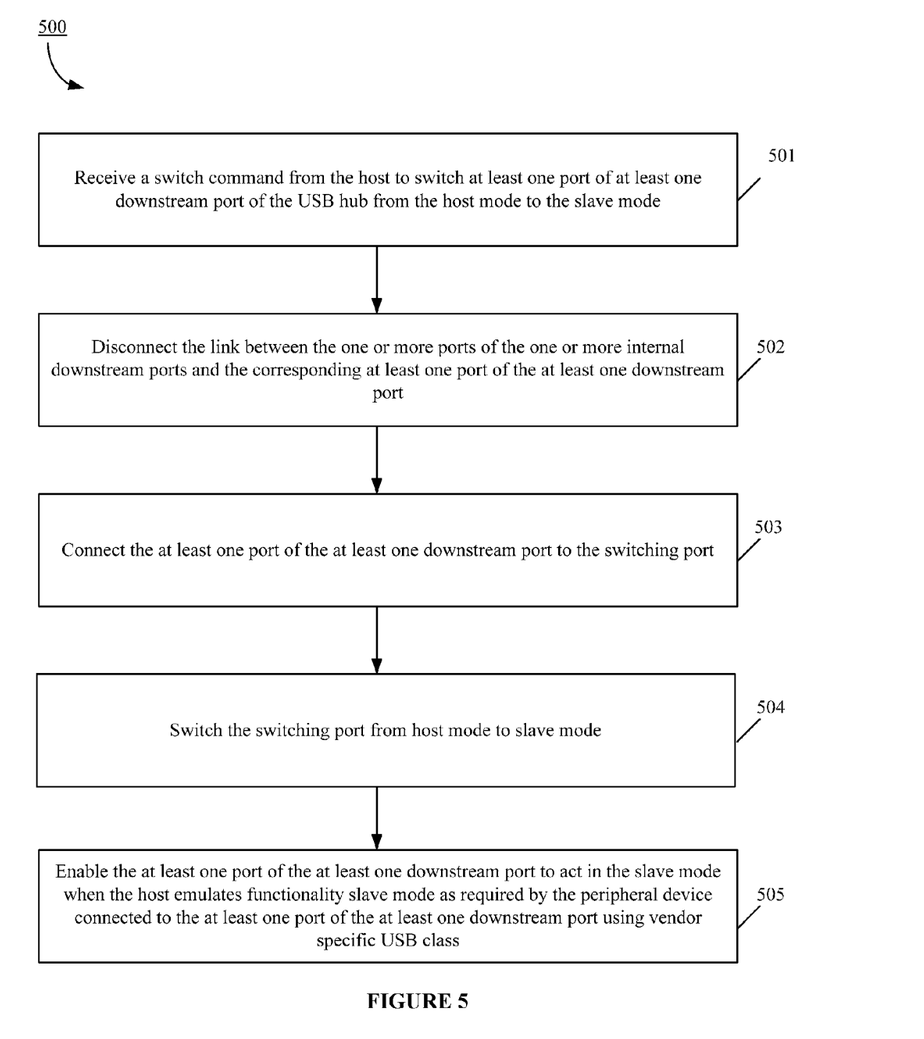
FIG. 5 illustrates a flowchart of method for switching multiple downstream ports between the host mode and the slave mode in accordance with some embodiments of the present disclosure.

As illustrated in FIGS. 4 and 5, the methods 400 and 500 comprises one or more blocks for switching the downstream port (105/120) between the host mode and the slave mode. The methods 400 and 500 may be described in the general context of computer executable instructions. Generally, computer executable instructions can include routines, programs, objects, components, data structures, procedures, modules, and functions, which perform particular functions or implement particular abstract data types.

The order in which the methods 400 and 500 are described is not intended to be construed as a limitation, and any number of the described method blocks can be combined in any order to implement the methods 400 and 500. Additionally, individual blocks may be deleted from the methods 400 and 500, without departing from the scope of the subject matter described herein. Furthermore, the methods 400 and 500 can be implemented in any suitable hardware, software, firmware, or combination thereof.

FIG. 4 illustrates a flowchart of method 400 for switching a downstream port 106 between the host mode and the slave mode in accordance with some embodiments of the present disclosure.

At block 401, the control unit 110 of the switching module 108 receives a switch command from the host 101 to switch the downstream port 105 of the USB hub 103 from the host mode to a slave mode. The switch command is provided by the host 101 to enable a corresponding device port 106 of the peripheral device 107 connectable with the downstream port 105 to act in the host mode.

At block 402, the control unit 110 switches the switching port 111 from host mode to slave mode.

At block 403, the control unit 110 enables the downstream port 105 to act in the slave mode when the host 101 emulates functionality of slave mode as required by the peripheral device 107 connected to the downstream port 105 using vendor specific USB class. Thus, the device port 106 of the peripheral device 107 acts in the host mode upon enabling the downstream port 105 to act in the slave mode.

FIG. 5 illustrates a flowchart of method 500 for switching the at least one downstream port 120 between the host mode and the slave mode in accordance with some embodiments of the present disclosure.

At block 501, the control unit 125 of the switching module 123 receives a switch command from the host 112 to switch the at least one port of at least one downstream port 120 of the USB hub 114 from the host mode to a slave mode. The switch command is provided by the host 112 to enable a corresponding device port 121 of the peripheral device 122 connectable with the at least one port of the at least one downstream port 120 to act in the host mode.

At block 502, the control unit 125 disconnects the link between the one or more ports of the one or more internal downstream ports 118 and the corresponding at least one port of the at least one downstream port 120.

At block 503, the control unit 125 connects the at least one port of the at least one downstream port 122 to the one end of the switching port 126.

At block 504, the control unit 125 switches the switching port 126 from host mode to slave mode.

At block 505, the control unit 125 enables the at least one port of the at least one downstream port 120 to act in the slave mode when the host 112 emulates functionality of slave mode as required by the peripheral device 122 connected to the at least one port of the at least one downstream port 120 using vendor specific USB class. Thus, the device port 121 of the peripheral device 122 acts in the host mode upon enabling the at least one port of the at least one downstream port 120 to act in the slave mode.

Additionally, advantages of present disclosure are illustrated herein.

Embodiments of the present disclosure provide enables any peripheral device to act in the host mode i.e. to make the peripheral device as host.

Embodiments of the present disclosure perform switching between the host mode and the slave mode dynamically. It also, eliminates switching the connection of the ports manually.

Embodiments of the present disclosure perform switching using a single USB hub.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microcontroller and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the disclosure, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Host |
| 102 | Host Port |
| 103 | Universal Serial Bus (USB) Hub |
| 104 | Upstream Port |
| 105 | Downstream Port |
| 106 | Device Port |
| 107 | Peripheral Device |
| 108 | Switching Module |
| 109 | Master Port |
| 110 | Control Unit |
| 111 | Switching Port |
| 112 | Host |
| 113 | Host Port |
| 114 | USB Hub |
| 115 | Upstream Port |
| 116 | Internal Hub |
| 117 | Internal Upstream Port |
| 118a, 118b, . . . , 118n | Internal Downstream Port |
| 119a, 119b, . . . , 119n | First Interface |
| 120a, 120b, . . . , 120n | Downstream Ports |
| 121a, 121b, . . . , 121n | Device Ports |
| 122a, 122b, . . . , 122n | Peripheral Devices |
| 123 | Switching Module |
| 124 | Master Port |
| 125 | Control Unit |
| 126 | Switching Port |
| 127 | Second Interface |

The invention claimed is:

1. A Universal Serial Bus (USB) hub for switching downstream ports between host mode and slave mode, the USB hub comprising:
an upstream port with one end connectable to a host port of a corresponding host;
at least one downstream port with one end connectable to a device port of a peripheral device, wherein the at least one downstream port acts in host mode and said device port acts in slave mode;
an internal hub comprising:
an internal upstream port connectable to other end of the upstream port;
one or more internal downstream ports, wherein one or more ports of the one or more internal downstream ports are linked to other end of the corresponding at least one downstream port;
a switching module comprising:
a master port connectable to an internal downstream port of the one or more internal downstream ports;
a switching port, wherein the switching port acts in host mode;
a control unit configured to:
receive a switch command from the host to switch at least one port of the at least one downstream port from the host mode to a slave mode to enable the corresponding device port of the peripheral device to act in a host mode;
disconnect the link between the one or more ports of the one or more internal downstream ports and the corresponding at least one port of the at least one downstream port;
connect the at least one port of the at least one downstream port to the switching port;
switch the switching port from host mode to slave mode; and
enable the at least one port of the at least one downstream port to act in the slave mode when the host emulates functionality of slave mode as required by the peripheral device connected to the at least one port of the at least one downstream port using a vendor specific USB class, wherein the device port of the peripheral device acts in the host mode upon enabling the at least one port of the at least one downstream port to act in the slave mode.

2. The USB hub as claimed in claim 1, wherein the at least one port of the at least one downstream port is connectable to the one end of switching port through one or more interfaces.

3. The USB hub as claimed in claim 2, wherein the one or more interfaces is selected from at least one of a switch and a multiplexor.

4. The USB hub as claimed in claim 1, wherein the vendor specific USB class comprises Device Emulation Class (DEC) to emulate slave mode functionality as required by the peripheral device.

5. The USB hub as claimed in claim 4, wherein the control unit is configured to provide to the host a vendor specific USB class for emulating slave mode functionality as required by the peripheral device upon connecting the at least one port of the at least one downstream port to the one end of the switching port.

6. A method for switching downstream ports of a Universal Serial Bus (USB) between host mode and slave mode, the method comprising:
receiving, by a control unit of a switching module of the USB hub, a switch command from a host to switch at least one port of at least one downstream port of the USB hub from the host mode to a slave mode to enable a corresponding device port of a peripheral device connectable with the at least one port of the at least one downstream port to act in a host mode, said USB hub comprises an upstream port with one end connectable to a host port of the corresponding host, the at least one downstream port with one end connectable to the device port of the peripheral device, wherein the at least one downstream port acts in a host mode and said device port acts in a slave mode, and an internal hub comprising an internal upstream port connectable to other end of the upstream port and one or more internal downstream ports, wherein one or more ports of the one or more internal downstream ports are linked to other end of the corresponding at least one downstream port and at least one internal downstream port is linked to a master port of the switching module;
disconnecting, by the control unit, the link between the one or more ports of the one or more internal downstream ports and the corresponding at least one port of the at least one downstream port;
connecting, by the control unit, the at least one port of the at least one downstream port to a switching port of the switching module, wherein the switching port acts in host mode;

switching, by the control unit, the switching port from host mode to slave mode; and enabling, by the control unit, the at least one port of the at least one downstream port to act in the slave mode when the host emulates functionality of slave mode as required by the peripheral device connected to the at least one port of the at least one downstream port using a vendor specific USB class, wherein the device port of the peripheral device acts in the host mode upon enabling the at least one port of the at least one downstream port to act in the slave mode.

7. The method as claimed in claim 6, wherein the at least one port of the at least one downstream port is connectable to the one end of switching port through one or more interfaces.

8. The method as claimed in claim 7, wherein the one or more interfaces is selected from at least one of a switch and a multiplexor.

9. The method as claimed in claim 6, wherein the vendor specific USB class comprises Device Emulation Class (DEC) to emulate slave mode functionality as required by the peripheral device.

10. The method as claimed in claim 9, further comprises providing to the host the vendor specific USB class as required by the peripheral device upon connecting the at least one port of the at least one downstream port to the one end of the switching port.

\* \* \* \* \*